United States Patent [19]

McVey

[11] Patent Number: 4,567,396
[45] Date of Patent: Jan. 28, 1986

[54] INCREASED EFFICACY HIGH PRESSURE SODIUM LAMP YIELDED BY INCREASED WALL TEMPERATURE OPERATION

[75] Inventor: Charles I. McVey, Shaker Heights, Ohio

[73] Assignee: General Electric Company, Schenectady, N.Y.

[21] Appl. No.: 682,806

[22] Filed: Dec. 17, 1984

Related U.S. Application Data

[63] Continuation of Ser. No. 444,777, Nov. 26, 1982, abandoned.

[51] Int. Cl.$^4$ .......................... H01J 61/20; H01J 61/34
[52] U.S. Cl. ..................................... 313/25; 313/636; 313/571; 313/572; 313/637; 313/642
[58] Field of Search ................ 313/636, 25, 570, 637, 313/571, 572, 642, 643, 568

[56] References Cited

U.S. PATENT DOCUMENTS 3,248,590  4/1966  Schmidt .......................... 313/637 X
4,285,732  8/1981  Charles et al. ........................ 106/57

Primary Examiner—David K. Moore
Assistant Examiner—K. Wieder
Attorney, Agent, or Firm—John P. McMahon; Philip L. Schlamp; Fred Jacob

[57] ABSTRACT

A high pressure sodium lamp having an inner arc tube operated at an increased wall temperature so as to improve the efficacy of the lamp is disclosed. The improved high pressure sodium lamp has an arc tube which reduces the sodium losses typically experienced by high temperature operation. Also disclosed are desired parameters of the arc tube.

3 Claims, 1 Drawing Figure

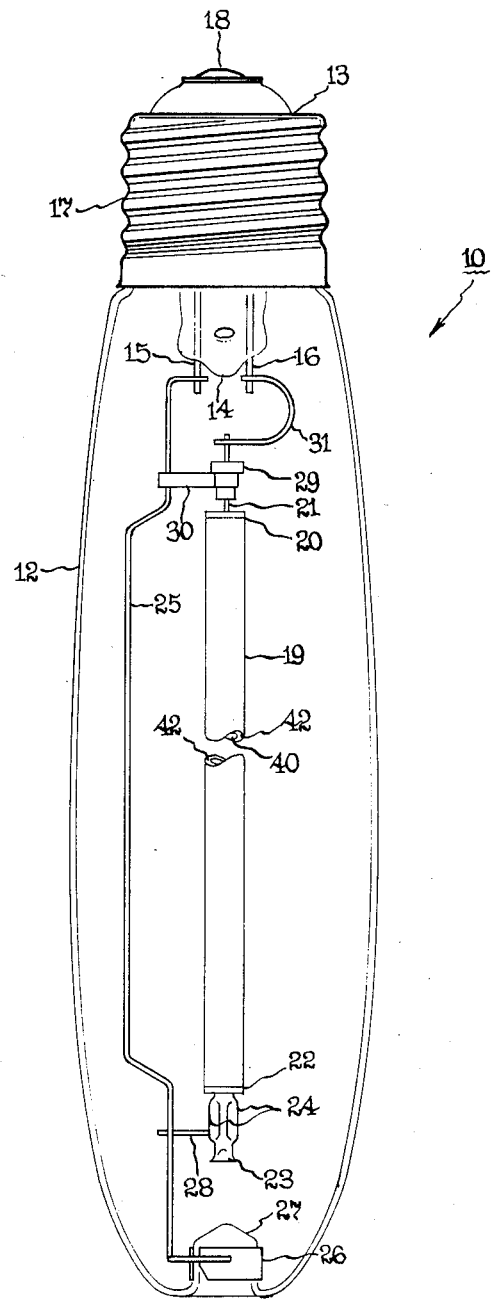

INCREASED EFFICACY HIGH PRESSURE SODIUM LAMP YIELDED BY INCREASED WALL TEMPERATURE OPERATION

This application is a continuation, of application Ser. No. 444,777, filed 11/26/82 now abandoned.

CROSS REFERENCE TO RELATED APPLICATION

U.S. patent application Ser. No. 444,778, filed concurrently herewith, for "High Pressure Sodium Lamp Having Improved Coloring Rendition" of J. Strok, assigned to the same assignee of the present invention.

BACKGROUND OF THE INVENTION

This invention relates to a high pressure sodium vapor lamp utilizing alumina ceramic inner envelope and is particularly concerned with a high pressure sodium lamp having an inner arc tube alumina ceramic operated at a higher than normal wall temperature which improves the efficacy of the high pressure sodium lamp.

High pressure sodium vapor lamps have found widespread use during the past decade for commercial lighting applications, especially outdoor lightings. Such lamps are described in U.S. Pat. No. 3,248,590—Schmidt, High Pressure Sodium Vapor Lamps. High pressure sodium lamps typically utilize a slender tubular inner envelope of transmissive refractory oxide material resistant to sodium at high temperatures, suitably high density polycrystalline alumina or synthetic sapphire. The inner envelope typically contains a gas atmosphere comprised of sodium along with a rare gas such as xenon to facilitate starting, and mercury for improved efficiency. The ends of the inner envelope are sealed by suitable closure members affording connection to thermionic electrodes which may comprise a refractory metal structure activated by electron emissive material. The ceramic arc tube is generally supported within an outer vitreous envelope or jacket provided at one end with the usual screw base. The electrodes of the inner envelope are connected to terminals of the base, that is to shell and center contacts. The space between the inner and outer envelope is typically evacuated in order to conserve heat.

The lumens per watt or efficacy of high pressure sodium (HPS) vapor lamps may be improved by increasing the operating temperature of the arc chamber of the arc tube of the HPS lamp. HPS lamps typically have arc chambers made of polycrystalline aluminum oxide which when subjected to an operation above 1200° C. causes sublimation which appreciably leads to diminished light output of the arc tube, which, in turn, reduces the lumen output of the HPS lamps. The sublimation products comprise suboxides of aluminum which deposit on the inside of the outer glass lamp jacket of the HPS lamp. Under certain conditions of lamp chemistry sodium has been observed to leave the interior of the arc chamber and form sodium beta-alumina in the wall of the alumina and permit the electrolysis of sodium. The sodium beta-alumina formations within the wall of the arc tube material during increased wall temperature operation cause the voltage of the HPS lamp to rise and also cause a light-absorbing browning of the outer jacket glass of the HPS lamp. The increase of HPS voltage and the browning of the outer jacket both contribute to decreasing the efficacy of the HPS lamp.

Accordingly objects of the present invention are to provide means for reducing the losses of a HPS lamp operated at relatively high wall temperatures contributed to by the sodium losses within the arc chamber of the HPS, and to provide such a high pressure sodium lamp having an improved efficacy.

These are the objects of the present invention and will become more apparent upon consideration of the following description of the invention.

SUMMARY OF THE INVENTION

This invention is directed to a high pressure sodium (HPS) vapor lamp operated at an increased wall temperature having means for reducing the sodium losses typically created by the increased wall temperature so as to improve the efficacy of the HPS lamp.

Accordingly, in one embodiment of the present invention, a high pressure metal vapor lamp having an outer vitreous envelope enclosing an inner arc tube having thermionic electrodes sealed in its ends containing a charge of vaporable metal having a typical sodium pressure of 60 torr, an inert starting gas such as xenon having a pressure in the range of 7 to 350 torr, and having a wall temperature in the range of 1100° C. to 1400° C. is disclosed. The inner arc tube is a chamber comprised of an optically translucent polycrystalline alumina ceramic formed with a component of MgO and having an additive selected from the group consisting of $ZrO_2$ and $HfO_2$ and mixtures thereof.

BRIEF DESCRIPTION OF THE DRAWINGS

The only drawing, FIG. 1, is a front elevational view of a high pressure sodium vapor discharge lamp according to the present invention.

DETAILED DESCRIPTION

A high pressure sodium vapor lamp 10 embodying the invention and corresponding to a conventional 400 watt size, but having an inner arc tube operating with a wall temperature in excess of 1140° C. in accordance with one embodiment of the practice of the present invention to be described hereinafter is illustrated in FIG. 1. The high pressure sodium (HPS) vapor lamp 10 comprises a vitreous outer envelope 12 with a standard mogul screw base 13 attached to the stem end which is shown uppermost in FIG. 1. A re-entrant stem press 14 has a pair of relatively heavy lead-in conductors 15 and 16 extending through the stem 14 and having outer ends of conductors 15 and 16 connected to the screw shell 17 and eyelet 18 of the base.

The HPS lamp 10 has inner envelope or arc tube 19 centrally located within the outer envelope 12. The arc tube 19 is comprised of a length of light transmitting ceramic formed of a polycrystalline aluminum ceramic which is translucent. The arc tube 19 contains a charge of vaporable metal including the addition of a metal buffer gas such as a mercury vapor with an operating pressure range of 0.1 to 5 atmospheres and having an emitting species of sodium at a typical operating pressure of 60 Torr. The upper end of the arc tube 19 is closed by an alumina ceramic plug 20 through which extends hermetically a niobium inlead 21 which supports an upper electrode (not shown) within the arc tube 19. The lower end of arc tube 19 has a closure which comprises a ceramic plug 22 through which extends a thin-walled niobium tube 23. The niobium tube 23 serves both as an inlead for arc tube 19 and a reservoir for excess alkali metal and mercury of the arc tube 19. The shank of the lower electrode (not shown) of arc tube 19 projects into tube 23 and is locked in place by crimping the tube 23 about the lower electrode at location 24 as shown in FIG. 1. The crimping leaves restricted channels which allows passage of the alkali metal and mercury in vapor form but prevents movement as a liquid amalgam within tube 23 whereby the lamp may be operated not only base-up, as shown in FIG. 1, but also operated in any orientation. The ceramic seals are described in greater detail in my U.S. Pat. No. 4,065,691, Ceramic Lamp Having Electrodes Supported by Crimped Tubular Inlead.

The arc tube 19 is of primary interest to the present invention and is illustrated in FIG. 1 as partially broken-away so as to show the arc chamber 40 and the walls 42 both of arc tube 19. The arc tube 19 comprises an optically translucent polycrystalline aluminum oxide ceramic formed with a component of magnesium oxide (MgO) and having an additive selected from the group consisting of zirconium oxide ($ZrO_2$), hafnium oxide ($HfO_2$) and mixtures thereof. The composition of MgO, along with the additives $ZrO_2$ and $HfO_2$ is described in U.S. Pat. No. 4,285,732—Aluminum Ceramic, assigned to the same assignee of the present invention and herein incorporated by reference.

U.S. Pat. No. 4,285,732 describes a method for producing an optically translucent polycrystalline sintered body through which light or radiation in the visible wavelength is able to pass through sufficiently to make such body useful for optical applications such as enclosures for arc tubes. I have determined that an arc containing tube such as my arc tube 19, having a composition described in U.S. Pat. No. 4,285,732, has an unexpected and surprising superior characteristic related to HPS lamps. I have determined that my HPS lamp 10 of FIG. 1 having such an arc tube is operable with wall temperatures greater than the typical wall temperature of 1200° C. described in the "Background" Section. Operation of a HPS lamp above this 1200° C. limitation increases the lumen output of HPS lamps and correspondingly increases the efficacy of the HPS lamp of FIG. 1.

I have further determined that an arc tube having the compositions and additives of U.S. Pat. No. 4,285,732 may be operated at higher wall temperature with reduced sodium loss. I have found that if the arc tube 19 is formed of MgO in the range of 0.03% to 0.15% and the additive of $ZrO_2$ and $HfO_2$ and mixture thereof is selected in the range of 0.002% to 0.12% the desired high wall operating temperature capability is obtained with significantly decreased loss of sodium from the arc and with greatly lessened outer jacket darkening.

In order that the invention may be more fully appreciated, references now made to comparative data of Table 1 between a standard HPS lamp and my improved efficacy HPS lamp 10 in accordance with the practice of this invention.

TABLE 1

| HPS PARAMETERS | Std LU400 Design | (A) Increased Loading LU400 | (B) Increased Loading LU400 |
| --- | --- | --- | --- |
| Bore | 7.25 mm | 7.25 mm | 5.5 mm |
| Arc Gap | 87 mm | 67 mm | 75 mm |
| Wall Loading | 18.0 w/cm$^2$ | 21.5 w/cm$^2$ | 27.0 w/cm$^2$ |
| Amalgam | 25% Na | 17% Na | 25% Na |

TABLE 1-continued

| HPS PARAMETERS | Std LU400 Design | (A) Increased Loading LU400 | (B) Increased Loading LU400 |
| --- | --- | --- | --- |
| Xenon Fill | 17 Torr | 17 Torr | 350 Torr |
| Cold Spot | 680° C. | 700° C. | 680° C. |
| Max Wall Temperature | 1140° C. | 1155° C. | 1260° C. |
| Sodium Pressure | 60 Torr | 60 Torr | 60 Torr |
| Efficacy | 125 LPW | 130 LPW | 150 LPW |
| X, Y Chromaticity | .512, .420 | .512, .420 | .512, .420 |
| Cor. Color Temp | 2100° K. | 2100° K. | 2100° K. |
| Color Rendering Index | 20 | 20 | 20 |

Table 1 lists the typical HPS parameters each related to, (1) a standard HPS lamp of the commercial available type LU400, (2) a first embodiment of the present invention listed in Table 1 as (A) Increased Loading LU400 and, (3) a second embodiment of the present invention listed in Table 1 as (B) Increased Loading LU400. From Table 1 it should be primarily noted that my first (A) and second (B) embodiments of my present invention show a 5 LPW and 25 LPW improvement, respectively, relative to the standard HPS lamp. Still further, it should be noted that my second (B) embodiment having the 25 LPW improvement is obtained by operating the wall temperature of the arc tube 19 at 1260° C.

Although not shown on table 1, it has been determined that by increasing the xenon fill gas pressure to be greater than the 350 Torr, the efficacy of my HPS lamp 10 is greater than 150 LPW. Still further, the xenon fill gas may have a relatively low pressure such as 7 torr for my HPS lamp 10 having a typical rating of 1000 watts.

The practice of my invention was demonstrated by comparative operation between ten (10) of my HPS lamps 10 and ten (10) standard HPS lamps all of the 400 watt type. The structural difference between my HPS lamps 10 and the standard HPS lamps was that my HPS lamps 10 had in place the arc tubes 19 having the improved polycrystalline alumina (PCA) material hereinbefore described. The standard HPS lamps and my improved HPS lamps 10 were operated at 800 watts for 100 hours. At this double power condition of 800 watts the peak arc chamber temperature of the standard HPS lamps and my improved HPS lamps 10 was about 1350° C. instead of the usual 1140° C. experience for 400 watt operation. The standard HPS lamps not having the improved PCA material were intercompared with my improved HPS lamps 10 having the improved PCA material and it was determined that for my improved HPS lamps 10 there was a reduced level of sublimation products and a virtual elimination of sodium loss from my arc chamber which is typically caused by sodium beta-alumina formations.

Further parameters such as arc watts and wall loading of my HPS lamp as in FIG. 1 and having representative improvements shown in Table 1 may be determined by first specifying HPS parameters in a similar manner to as described in U.S. Pat. No. 3,384,798 by Schmidt (page 3, lines 28-33) such as: (1) a HPS 400 wattage rating, (2) an arc tube 19 having a bore of 7.4 mm, (3) an arc tube 19 having a length of 9.3 cm, (4) an arc tube having an arc gap of 7.0 cm, and (5) an arc tube having a wall operating temperature of 1300° C. For such HPS parameter the arc watt characteristic may be determined by the relationship;

$$\text{Arc watts} = \text{HPS wattage rating} - \text{Typical End Losses in watts} \quad (1)$$
$$= 400 \text{ w} - 55 \text{ w}$$
$$= 345 \text{ watts}$$

Once the arc characteristic watt is determined by expression (1) then the wall loading characteristic may be determined by the following relationship $$\text{Wall loading} = \frac{\text{Arc Watt}}{(\pi) \, dl} \quad (2)$$
$$= \frac{345}{(3.1416)(.74)(7.0)}$$
$$= 21.2 \text{ watts/cm}^2$$

wherein d is the bore of the arc tube and has a value of 0.74 cm and 1 is the distance between the electrodes or the arc gap and has a value of 7.0 cm.

The wall loading parameter of my invention has a range of 18 to 37 watts/cm$^2$ which encompasses various wattage ratings of my improved HPS lamp 10. Still further, the wall temperature of my inner arc tube 19 may reach a temperature approaching 1400° C. Further still, in certain HPS lamps 10 contemplated by my invention the wall temperature of my inner arc tube 19 may be below 1140° C. such as a temperature of 1000° C.

In the Schmidt example described in U.S. Pat. No. 3,384,798 a safe temperature was considered to be 1300° C. for commercially available lamps at the time with a lamp life rating of 6000 hours. Subsequently in order to achieve a life rating of 24,000 hours it was necessary to use a wall loading of 18 watts/cm$^2$ for an arc tube wall temperature of 1140° C. maximum so as to avoid sodium loss and sublimation.

Examples (A) and (B) in Table I and my improved HPS lamps 10 described for the 800 watt operation are applications of this invention using the referenced improved arc tube material at higher wall loading and higher operating wall temperature than were heretofore possible.

It should now be appreciated that the practice of my invention provides the HPS lamp art an HPS lamp capable of an increased operating wall temperature of its inner arc tube which improves the efficacy of my HPS lamp with diminished sodium loss from the arc.

Although the invention has been described in its preferred forms with a certain degree of particularity, it is understood that the present disclosure of the preferred embodiments is made by way of examples and that modifications in the details of construction may be resorted to without departing from the true spirit and scope of this invention. It is intended that the patent shall cover, by suitable expression in the appended claims, whatever features of patentable novelty exist in the invention disclosed.

What I claim as new and desire to secure by U.S. Letters Patent of the United States is:

1. An improved high pressure metal vapor lamp having an outer vitreous envelope enclosing an inner arc tube having thermionic electrodes sealed in its ends and containing a charge of vaporable metal including the addition of a metal buffer gas such as mercury vapor with an operating pressure range of 0.1 to 5 atmospheres and having an emitting species of sodium at a typical operating pressure of 60 Torr, an inert starting gas such as xenon having a cold filling pressure in the range of 7 to 350 Torr, and an operating wall temperature in the range of 1000° C. to 1400° C., said inner arc tube comprising:

an optically translucent polycrystalline aluminum oxide ceramic formed of a composition of MgO and having an additive selected from the group consisting of ZrO$_2$, HfO$_2$ and mixtures thereof, and;

said inner arc tube in cooperation with the given buffer gas, sodium, and inert gas pressures as well as the wall temperature range being effective to reduce the typically expected operational sodium losses while increasing the efficacy of said high pressure metal vapor lamp.

2. A high pressure metal vapor lamp according to claim 1 having a wall loading parameter in the range of 18 to 37 watts/cm$^2$.

3. A high pressure metal vapor lamp according to claim 1 wherein said inner arc tube is formed of 0.03% to 0.15% MgO by weight and the additives ZrO$_2$ or HfO$_2$ or mixtures thereof are 0.002 to 0.12% by weight.

* * * * *